Patented Jan. 8, 1952

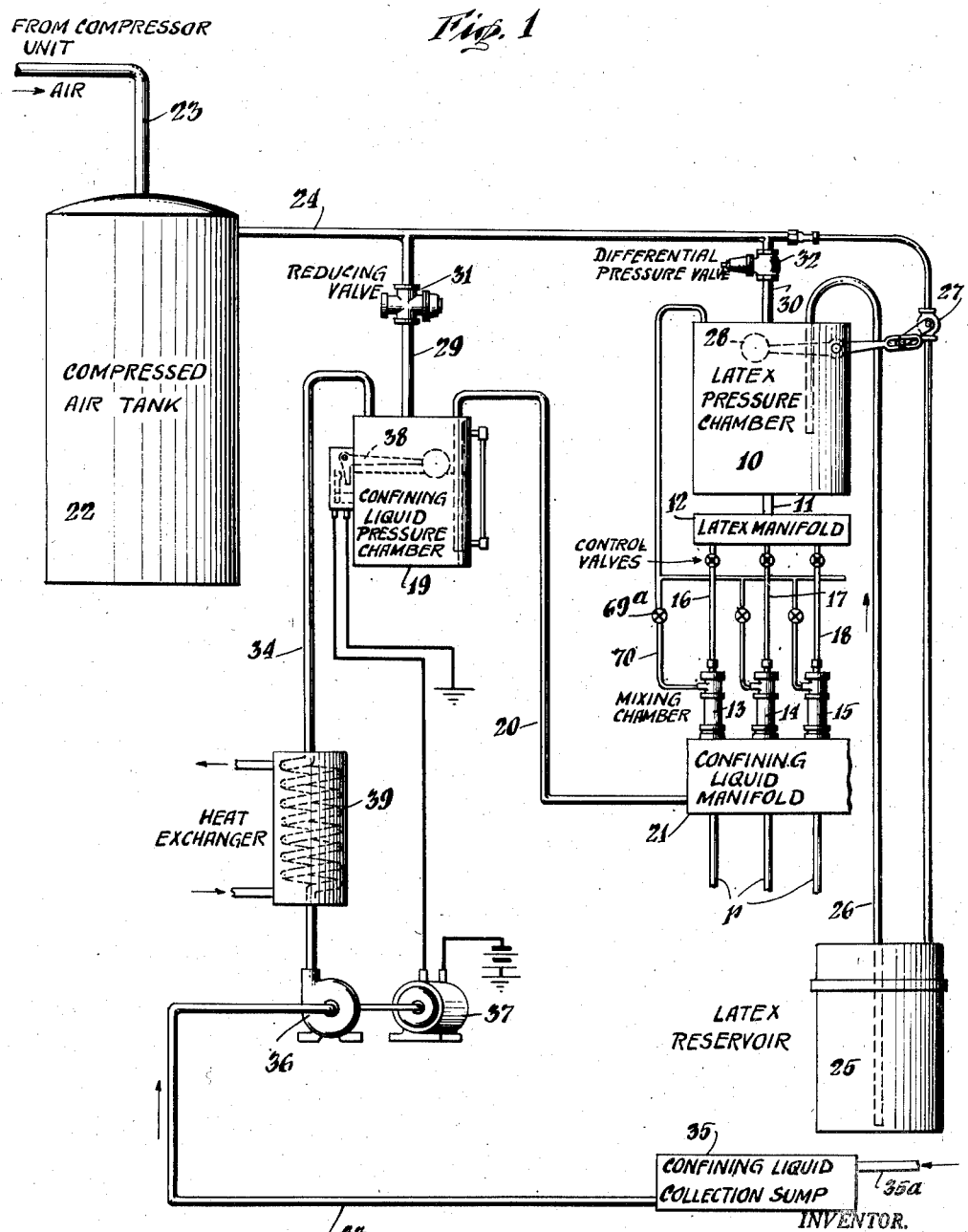

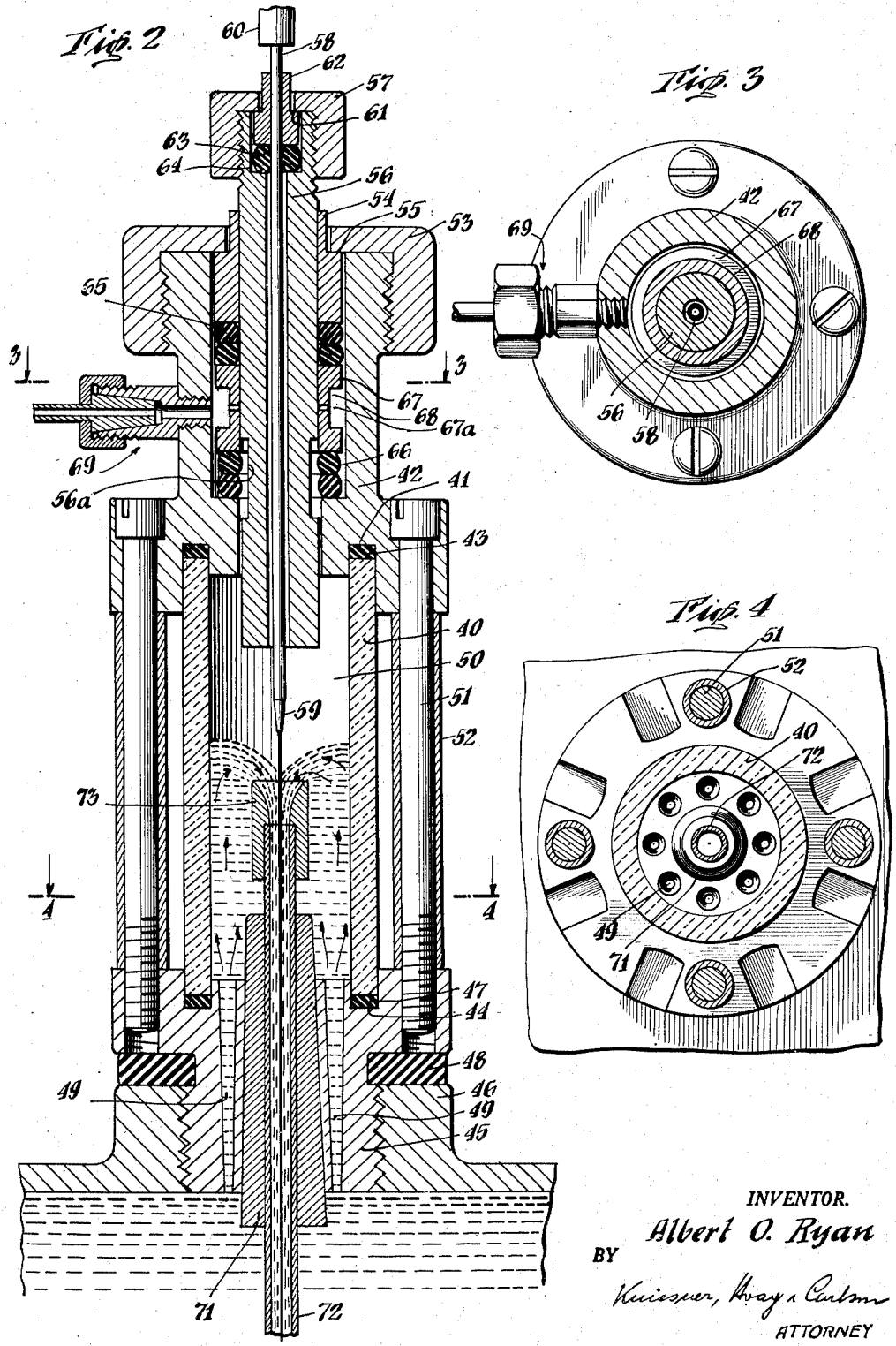

2,581,559

UNITED STATES PATENT OFFICE 2,581,559

MANUFACTURE OF FILAMENTARY ARTICLES

Albert O. Ryan, Norwalk, Conn., assignor to Redding Manufacturing Company, Inc., Norwalk, Conn., a corporation of Delaware Application July 19, 1948, Serial No. 39,432

18 Claims. (Cl. 18—8)

My invention relates to the manufacture of filaments from liquids susceptible to solidification or hardening either by physical or chemical means, and comprises both method and apparatus improvements.

The invention may be considered an improvement over the invention described in my United States Patent No. 2,402,846, granted June 25, 1946 and my co-pending application Serial No. 183,597, filed September 7, 1950, which is a division of application Serial No. 491,476, filed June 19, 1943, now Patent No. 2,402,846, and a continuation-in-part of co-pending application Serial No. 677,972, filed June 20, 1946, now abandoned. It is particularly valuable as applied in the manufacture of filamentary articles including filaments, tapes, ribbons and the like. Such articles may be made from a wide variety of materials, hereinafter referred to generally as filament forming material, and including for example, latices or dispersions of rubbers and elastomers, natural, synthetic and artificial; dispersions in water, solvents or plasticizers of resins or polymers of the thermoplastic and thermosetting type while in thermoplastic stage; solutions of rubbers, resins and cellulose derivatives, and resinous and other material including, for example, low melting point alloys, asphalts, etc. capable of being liquified and hardened, and liquid polymers which can be solidified further by the application of heat in contact with suitable catalysts.

According to the method set forth and claimed in my Patent No. 2,402,846, which is preferably practiced using the system of apparatus hereinafter described and claimed, the filament forming liquid is projected in a particular manner as a fine stream, or as a plurality of streams, having a cross sectional area dependent on the size of the filamentary article it is desired to produce, into the center of a stream of another or hardening liquid hereinafter referred to as confining liquid, and is carried therein under conditions not permitting of distortion of the fine stream for a period of time sufficient for solidifying the material and at least partially hardening it.

The hardening treatment may vary in accordance with the filament forming material employed. Thus, for example, it may be hardened by heating or cooling, or by chemical reaction. The confining liquid may be employed as a heating or cooling medium and its temperature modified for this purpose. A confining liquid may be selected which, apart from its temperature, for example, has a coagulating effect upon the filament forming material; or which serves to extract the solvent of the filament forming material. Thus the confining liquid may be heated, for example, for hardening rubber latex to form rubber thread, or cooled for hardening a molten material such, for example, as a resin, a low melting point alloy, etc.; or it may be employed to dehydrate the material as, for example, by the use of a combination of heat and glycerine, or to carry on a polymerization step etc.

The confining liquid will ordinarily be of relatively greater cross sectional area than that of the stream of filament forming material and sufficiently viscous to flow through the tube with viscous flow. This type of flow is characterized by absence of turbulence and the fact that the filament forming liquid and the confining liquid will not mix irrespective of whether they are otherwise miscible or immiscible. The viscous confining liquid is retarded adjacent the inner surface of the tube by frictional contact with the tube, whereas the portion nearer the center of the tube will move more rapidly. The filament forming material is introduced into the stream of confining liquid at substantially the same speed as that of the confining liquid in the center area and the filament forming material therefore travels down the tube within the confining liquid without tension.

My method is superior to methods heretofore proposed for forming filamentary articles, particularly in that the stream of filament forming liquid is never at any time under tension which is advantageous in that the product thread is never appreciably attenuated during its formation, at any point along its length and is therefore characterized by high uniformity in diameter.

Prior art methods of manufacturing filamentary articles are unsatisfactory because they have involved tension on the article during its formation, thus limiting the speed of manufacture and impairing its quality and its uniformity in diameter. Those processes in which the filament forming material has been extruded through a nozzle into a heated or cooled coagulating medium have experienced difficulty due to the heating or cooling of the nozzle resulting from its contact with the coagulating medium which causes the filamentary material to adhere to the nozzle and to form a sticky mass on the nozzle impairing the discharge of the material from the nozzle.

Accordingly, it is an object of my invention to provide a method and apparatus for overcoming the deficiencies of the prior art.

Another object of the invention is to provide a simple method and apparatus by which filamentary articles may be manufactured continuously at high speed substantially above the speeds employed in prior art methods.

Another object of the invention is to provide method and apparatus for making filamentary articles continuously wherein the extrusion of the material from the forming nozzle is unhampered by deposit of the material on the nozzle.

Another object of the invention is to provide a method and apparatus for accurately and automatically centering a stream of filament forming material (which may comprise a single stream or a number of closely grouped streams) within a stream of confining liquid.

Another object of the invention is to provide for flexible and accurate control of the diameter of a filamentary article and to make it possible to manufacture such articles having improved regularity in form and in surface finish with increased ease and accuracy of control, and to effect a substantial economy in the time required for starting and stopping or changing from one manufacturing operation to another, involving, for example, a change in the size or kind of filament being manufacture.

Other objects of the invention will be in part obvious or in part pointed out hereinafter.

The invention accordingly consists of the features of construction, combinations of elements, arrangements of parts, and in the several steps and relation and order of each of said steps to one or more of the others thereof, all as will be pointed out in the following description, and the scope of the application of which will be indicated in the following claims.

For the purpose of illustration I shall particularly describe my invention in connection with the formation of latex filaments and with the aid of the accompanying drawings wherein:

Figure 1 schematically illustrates in elevation a novel system of apparatus suitable for carrying out the invention;

Figure 2 is a sectional elevation of one of the mixing chambers positioned atop the "confining liquid manifold" in Figure 1;

Figure 3 is a plan view taken on the line 3—3 of Figure 2; and

Figure 4 is a plan view taken on the line 4—4 of Figure 2.

The system of Figure 1 will be seen as comprising a source of supply of liquid latex 10, legended in the drawing "Latex Pressure Chamber," connecting, via a short section 11, with a manifold 12 serving mixing chambers 13, 14, and 15 through valve-controlled lines 16, 17 and 18, respectively, a source of supply of confining liquid 19, legended "Confining Liquid Pressure Chamber," connected via line 20 with a manifold 21, and various auxiliary equipment including a source of compressed air 22 charged via line 23 extending to a compressor unit, not shown. In lieu of air, nitrogen or other inert gas may be used.

For the confining liquid it is desirable to employ a liquid, or a combination of liquids, having; physical and chemical properties which provide a high boiling point, and stability against thermal decomposition, making possible the use of heat at high temperatures; excellent solvent power and relative chemical inertness which permits the use therein of solutes of numerous acids, salts, ionic and catalytic or hardening agents. A confining liquid having a dehydrating action is desirable since the dehydrating action will aid any or all actions where aqueous dispersions are employed. Ease of recovery by distillation and fractionation has the advantage of economy since it facilitates reuse of the liquid. A high viscosity at high temperatures is very desirable for high flow rates. Selection of the confining liquid accordingly may depend upon a number of factors such for example as the filament forming material employed, the rate of flow desired, the temperature employed, the availability of the material, and its expense.

Glycerine is well suited for use as a confining liquid for forming filaments from latex since it has most of the above mentioned properties. However, a variety of other liquids having some or all of the above mentioned properties may be employed in place of glycerine including for example the glycols and the sorbitols, a water thickened with various thickening agents such for example as sodium carboxyl methyl cellulose. For some applications, for example when heat transfer is involved the confining liquid can be completely immiscible with the liquid being hardened. For the purpose of simplification the confining liquid is hereafter referred to in the description as "glycerine."

Compressed air tank 22 connects via line 24 with a latex reservoir 25 serving the latex pressure chamber 10 through line 26. A valve 27 in line 24, just below the elbow, is under the control of float mechanism 28 in chamber 10, being open or shut depending on the liquid level in each chamber. Chambers 19 and 10 are charged with air from tank 22 via connections 29 and 30, respectively. Connection 29 is provided with a reducing valve 31; connection 30 with a pressure differential valve 32.

Tank 19, referred to hereinbefore as the source of glycerine supply, is itself supplied via lines 33 and 34, from sump 35 by means of pump 36 powered by motor 37 which is under the control of float 38 in tank 19. Exchanger 39 in line 34 heats the glycerine during passage of the glycerine therethrough to a temperature of the order of 180–220° F.

The mixing chambers 13, 14 and 15 are identical in construction and will be described with particular reference to Figures 2–4 in which the numeral 40 denotes a cylindrical body member, advantageously formed of glass to permit visual observation of the liquid flow therein. The upper rim of the cylindrical body member nests within a complementary groove 41 in a flanged head member 42, the groove being provided with an annular gasket 43 formed of rubber or other resilient material and which desirably may take the form of an O-ring. The lower rim of the body member 40 is similarly secured within a circular groove 44 in the upper surface of a flanged base member 45, coupling with connection 46 which is bolted or otherwise fastened to the top of the manifold 21. Groove 44 is provided with a resilient gasket 47, while a somewhat larger gasket 48 is interposed between the flange of the base member and the connection 46. A plurality of vertical passageways 49 in base member 45, each progressively increasing in cross sectional area from bottom to top, permit the introduction of glycerine from manifold 21 into the chamber 50 defined for the most part by body member 40. Head member 42 and base member 45 are connected through set screws 51 which extend through sleeves or standards 52, useful as supports in assembling and dis-assembling the unit, and which in coaction with gaskets 43 and 47 serve to maintain chamber 50 essentially gas-tight.

The upper portion of head member 42 is threaded to receive a cap 53 bearing on a collar 54 provided with a shoulder 55. An annularly grooved sleeve member 56, threaded at the top to receive a cap 57, extends through collar 54 and into the chamber 50 to serve as a guide for a hollow needle-like supply tube 58 provided at its lower end with a nozzle 59, the orifice of which depends on the size and shape of the filamentary article. Tube 58 is further equipped with a coupling 60 by means of which it is connected to one of the latex supply lines extending from manifold 12.

Cap 57 threaded on sleeve 56 bears on shoulder 61 of a collar 62 which in turn bears on a small annular sealing gasket 63 in a well 64 bored in the upper end of the sleeve. In a manner similar to collar 62, collar 54 bears on double sealing gaskets 65 surrounding sleeve 56. Between these gaskets and another set of sealing gaskets 66 is interposed a ring 67 having an annular groove 68 from which a radial air passage 67a may extend through the ring to facilitate communication with chamber 50. Sleeve 56 has a portion 56a of reduced diameter forming an annular groove around the sleeve and the lower end of ring 67 extends over this groove and gaskets 66 are sealed in it. Ring 67 fits sufficiently loosely so that air can be introduced to or escape from chamber 50 through fixture 69 which connects with one of the valve-controlled lines 70 (see Figure 1). Air pressure in chamber 50 can also be reduced by loosening rotary cap 57 thus reducing the pressure on gasket 63.

Tube 72 is shown extending into the mixing chamber through a core 71 in base member 45. Core 71 may be unitary with tube 72 or shrunk thereon so that no seal between the core and tube is required. The vertical axis of tube 72 coincides with that of needle 58 and nozzle 59. Tube 72 is preferably flared at its top or provided with a fixture 73 giving the effect of a flared top and is normally spaced from the tip of the nozzle 59 about as indicated in the drawing (Figure 2). The lower end of the tube extends through manifold 21 and its length may be varied according to the materials and the subsequent steps employed.

In operation of the system, as should be apparent from the foregoing, heated glycerine is continuously forced from tank or chamber 19, by pressure of air admitted from compressed air tank 22, through line 20 into manifold 21, thence upwards through the passageways 49 into chamber 50 and over the rim of the fixture 73. The increasing diameter of the passageways 49 tends to avoid turbulence at their mouths opening to the chamber, reduced the inertia of the flowing liquid, and moreover, simplifies the boring of the passageways which desirably are entirely uniform and spaced equidistant about the core 71.

Compressed air admitted at the top of chamber 10 forces latex through the latex manifold and thence via lines 16, 17 and 18 through the needles in the mixing chambers respectively. The pressure on the glycerine and the pressure of the gas or air within chamber 50 are balanced to control the level of the glycerine within chamber 50 so that it will extend over the upper rim of tube 72 and provide a liquid seal preventing the escape of gas or air from chamber 50, without rising so far above the top of tube 72 as to destroy the converging funnel-shaped flow which is utilized to insure centering of the stream or streams of filament forming material within the stream of glycerine. Even if the filament forming liquid is for any reason not projected accurately into the center of the stream of glycerine it will land on the converging, funnel-shaped surface of the glycerine and will be carried into the center of the stream of glycerine within tube 72. Thus even if the nozzle 59 or its supply tube should be bent, or the tube and nozzle orifices misaligned for any reason the misalignment is compensated for by the converging flow of the glycerine into the tube over its upper rim.

The spacing of the nozzle 59 from the glycerine, which, as stated above, may be heated or cooled for coagulating the filament forming material, prevents the nozzle 59 from being heated or cooled by the glycerine. Thus, the temperature of the nozzle remains substantially unaffected by the temperature of the glycerine or other coagulating medium used. The air or gas which is trapped within chamber 10 and which serves to balance the pressure on the glycerine, surrounds the nozzle 59 and serves to insulate it. Furthermore, the continuous flow of filament forming material through the nozzle 59 may be utilized to cool the nozzle. The difficulty of the prior art methods wherein the filament forming material is caused to be partly coagulated by contact with the nozzle and therefore adheres to the nozzle and builds up thereon in a sticky mass is thus entirely obviated.

Referring again now to Figure 2, it will be seen that glycerine, the flow of which is indicated by the arrows, is caused to cascade over the rim of the fixture 73 to provide a converging, funnel-shaped liquid surface converging from above the rim of the fixture to within tube 72, and that the stream of filament forming latex is projected into the center of the funnel-shaped surface. The stream of latex as it moves downwardly through the tube 72, confined within the relatively larger stream of glycerine, gradually coagulates until it is completely solidified by the time it reaches the lower end of the tube. The filamentary product may be led from the forming tube 72 directly through further processing steps, as for example, to further harden it, to wash it, to dry it, to modify its temperature, to vulcanize it in the case of rubber thread, and the like, etc., and desirably may be led directly into apparatus for further processing it such as is described in my copending application Serial No. 39,431, filed July 19, 1948. The glycerine or other coagulating and confining liquid may be collected and returned as through tube 35a into the sump 35 for recirculation, or it may be advanced with the filamentary article to further partake in the further processing of the filamentary article, as is disclosed in my copending application Serial No. 183,597 filed September 7, 1950.

Control of the level of the funnel-like surface of glycerine in the chamber 50 is accomplished through manipulation of the cap 53, which when loosened permits gas or air to escape from or be introduced into chamber 10, and the valve 69a in the line connected to fixture 69. Such level should be held as steady or unvarying as possible and should never be allowed to extend above or into contact with the tip of the nozzle or below the upper rim of fixture 73. The rate of flow of the latex is, of course, dependent on the pressure differential between chamber 50 and the latex pressure chamber 10. Under conditions of viscous flow, as has been previously indicated, the rate of flow of the filament forming material conforms exactly with the rate of flow of the glycerine stream at its center.

Inasmuch as the glycerine hardens the latex by dehydrating it as well as by heating it, a portion of the glycerine should preferably be cycled through a fractionating column or other equipment adapted to separate water from glycerine. In this way harmful amounts of water can be prevented from accumulating in the system. When the glycerine is dehydrated by fractionation it may be possible, depending on the amount cycled through the fractionator, to dispense with the heat exchanger shown in Figure 1 of the drawings herein.

It will thus be seen that there has been provided by this invention a method and apparatus in which the various objects hereinabove set forth together with many thoroughly practical advantages are successfully achieved. As various possible embodiments might be made of the mechanical features of the above invention and as the art herein described might be varied in various parts, all without departing from the scope of the invention, it is to be understood that all matter hereinbefore set forth or shown in the accompanying drawing is to be interpreted as illustrative and not in a limiting sense.

What I claim is:

1. The method of forming a filamentary article which comprises flowing a stream of liquid into a closed chamber and causing it to cascade over the upper rim of a tube extending into said chamber and to flow therethrough with viscous flow, regulating the height of said liquid within said chamber by regulating the pressure of gas introduced into said chamber above said liquid and projecting a stream of filament forming liquid into the converging portion of said stream of viscous liquid to cause said filament forming liquid to be confined at the center of said stream of liquid.

2. A system of apparatus for manufacturing filamentary articles which comprises a plurality of mixing chambers each having a tube leading therefrom, a closed pressure chamber for a filament forming liquid, a filament forming liquid manifold, conduit means between said mixing chambers individually and said filament forming liquid manifold, and conduit means intercommunicating between said pressure chamber and said manifold, a closed confining liquid pressure chamber, a confining liquid manifold, conduit means between said mixing chambers individually and said confining liquid manifold, a conduit communicating between said confining liquid pressure chamber and said confining liquid manifold, a source of compressed air, and a conduit communicating between said source of compressed air and said filament forming liquid reservoir, a valve in said conduit, means in said filament forming liquid pressure chamber for controlling said valve, a conduit interconnecting said source of compressed air and said pressure chamber, a conduit interconnecting said source of compressed air and said confining liquid pressure chamber, and a connection between said filament forming pressure chamber and said mixing chambers individually to introduce gas under pressure to said mixing chambers from said filament forming pressure chamber.

3. The system as claimed in claim 2 including a confining liquid sump, a return conduit between said sump and said confining liquid pressure chamber, and means controlled by the liquid level in the confining liquid pressure chamber for returning liquid from said sump to said chamber.

4. The system of apparatus comprising a plurality of mixing chambers, means for supplying filament forming material to said mixing chambers under pressure, means for supplying a confining liquid under pressure to said mixing chambers in which each mixing chamber comprises a head having a central bore, a hollow sleeve member extending through said head into said chamber, said means for supplying filament forming material extending through said sleeve and communicating with said filament forming liquid manifold, packing means between said sleeve and said tube, and adjustable means for exerting pressure on said packing means capable of controlling the completeness of the seal effected by said packing means to thereby control the gas pressure within said chamber.

5. A system of apparatus for manufacturing filamentary articles which comprises an enclosed chamber, an elongated vertically disposed tube extending through the bottom of said chamber, a source of supply of filament forming material, a source of supply of a confining liquid, conduit means extending from the source of supply of said viscous liquid to within said chamber below the upper end of said elongated tube and discharging into said chamber at a multiplicity of points with even distribution around said tube thereby achieving uniformity of flow and substantially complete avoidance of turbulence, means for admitting gas to said chamber and for exhausting it from said chamber to control the level of said confining liquid within said chamber and maintain it at a level such that it forms a liquid seal over the top of said elongated tube and flows into the top of the tube with a converging funnel-like flow, and a supply tube for said filament forming material extending into said chamber and disposed so as to project a stream of filament forming material substantially into the center of the converging funnel-like flow of said confining liquid.

6. The system of apparatus comprising a plurality of mixing chambers, means for supplying filament forming material to said mixing chambers under pressure, means for supplying a confining liquid under pressure to said mixing chambers in which each mixing chamber comprises a head having a central bore, a hollow sleeve member extending through said head into said chamber, said means for supplying filament forming material extending into said sleeve and communicating with said filament forming liquid manifold, packing means between said sleeve and said tube, a collar surrounding said sleeve having an outwardly extending shoulder, a cap surrounding the upper portion of said head and bearing on said shoulder, and sealing means within the bore of said head extending around said sleeve, other sealing means within said bore and around said sleeve, and an annularly grooved ring fitting loosely around said sleeve between said sealing means and said other sealing means, a radial air passage extending through said ring to facilitate communication between the annular groove of said ring and said chamber, said other sealing means being positioned around a portion of said sleeve which is of reduced diameter, and a valve controlled gas line interconnecting said pressure chamber for filament forming material with the said annular groove of said ring.

7. The system of apparatus comprising a plurality of mixing chambers, means for supplying filament forming material to said mixing chambers under pressure, means for supplying a confining liquid under pressure to said mixing chambers in which each mixing chamber comprises a head having a central bore, a hollow sleeve member extending through said head into said chamber, said means for supplying filament forming material extending through said sleeve and communicating with said filament forming liquid manifold, packing means between said head and said sleeve, a collar surrounding said tube having an outwardly extending shoulder, the upper end of said sleeve being recessed to receive said collar, an adjustable cap surrounding the upper end of said sleeve and bearing on said shoulder, and sealing means within said recess around said tube beneath said collar.

8. A system of apparatus for manufacturing filamentary articles which comprises a plurality of mixing chambers, a first liquid manifold and conduit means interconnecting said first liquid manifold with said mixing chambers individually, a second liquid manifold and conduit means communicating between said second liquid manifold and said mixing chambers individually and discharging into said mixing chambers below the conduit means from said first liquid manifold, a tube leading from each of said mixing chambers and each having its longitudinal axis aligned with the discharge end of the conduit means leading to the mixing chamber from said first liquid manifold, a plurality of closed pressure chambers, a source of compressed air, conduits between said pressure chambers and said manifolds respectively for supplying liquid to said manifolds under pressure, and connections between said source of compressed air and said pressure chambers respectively, and a gas connection between one of the pressure chambers and said mixing chambers individually to control the pressure differential between said mixing chambers and said pressure chamber.

9. The system of apparatus comprising a plurality of mixing chambers, means for supplying filament forming material to said mixing chambers under pressure, means for supplying a confining liquid under pressure to said mixing chambers in which each mixing chamber comprises a head, a base, a member closed except at its ends disposed between said head and base, and means for interconnecting said head and base to hold said member between them, coupling means uniting said base to said second liquid manifold, said means for supplying a confining liquid including port means in said base communicating between the interior of said second liquid manifold and the chamber defined within said member between said head and said base.

10. The system of apparatus as claimed in claim 9 in which said port means comprises passageways of increasing cross sectional area from bottom to top.

11. The system of apparatus as claimed in claim 9 in which the bottom surface of said head and the top surface of said base are grooved to receive the upper and lower edges of said member.

12. A system of apparatus for manufacturing filamentary articles which comprises, a closed chamber defining a confined air space, a first tube passing into the chamber through its bottom with the top of the tube disposed above the bottom of the chamber and a substantial distance below the top of the chamber, conduit means for introducing a first liquid into said chamber from the bottom of the chamber so that it flows up around the said upper portion of said tube which is within the chamber and cascades into the tube over the upper rim thereof, a second tube extending into said chamber with its discharge end aligned with the longitudinal axis of said first tube to discharge a second liquid into said first tube at substantially the center of the flow of said first liquid into said first tube over the upper rim of the first tube, means for controlling the pressure under which said first liquid is supplied to said chamber, and means for controlling the pressure under which said second liquid is supplied to said chamber, including means for introducing gas into, or withdrawing it from, said chamber above the level of said first liquid within said chamber.

13. A system of apparatus for manufacturing filamentary articles which comprises, a closed chamber defining a confined air space, a first tube passing into the chamber through its bottom with the top of the tube disposed above the bottom of the chamber and a substantial distance below the top of the chamber, conduit means for introducing a first liquid into said chamber from the bottom of the chamber so that it flows up around the said upper portion of said tube which is within the chamber and cascades into the tube over the upper rim thereof, a second tube extending into said chamber with its discharge end aligned with the longitudinal axis of said first tube to discharge a second liquid into said first tube at substantially the center of the flow of said first liquid into said first tube over the upper rim of the first tube, means for controlling the pressure under which said first liquid is supplied to said chamber, and means for controlling the pressure under which said second liquid is supplied to said chamber, including means for introducing gas into, or withdrawing it from, said chamber above the level of said first liquid within said chamber, the internal bore of said first tube being flared outwardly at its upper end.

14. A system of apparatus for manufacturing filamentary articles which comprises, a closed chamber defining a confined space, a first tube passing into the chamber through its bottom with the top of the tube disposed above the bottom of the chamber and a substantial distance below the top of the chamber, conduit means for introducing a first liquid into said chamber from the bottom of the chamber so that it flows up around the said upper portion of said tube which is within the chamber and cascades into the tube over the upper rim thereof, a second tube extending into said chamber with its discharge end aligned with the longitudinal axis of said first tube to discharge a second liquid into said first tube at substantially the center of the flow of said first liquid into said first tube over the upper rim of the first tube, means for controlling the pressure under which said first liquid is supplied to said chamber, and means for controlling the pressure under which said second liquid is supplied to said chamber, including means for regulating the level of said first liquid within said chamber by introducing gas into, or withdrawing it from, said chamber above the said first liquid.

15. In a system of apparatus for manufacturing filamentary articles, an enclosed chamber, an elongated vertically disposed tube extending through the bottom of said chamber, a source of supply of filament forming material, a source of supply of a confining liquid, conduit means extending from the source of supply of said confining liquid through the bottom of said chamber and discharging into said chamber around said tube with a balanced flow thereby achieving even distribution of the entering confining liquid and substantially complete avoidance of turbulence, said confining liquid flowing into the top of said elongated tube, a supply tube for said filamentary forming material extending into the chamber and disposed to project a stream of filament forming material substantially into the center of the said flow of confining liquid, and means for admitting gas to said chamber and for exhausting it from said chamber to control the pressure within said chamber.

16. An element of apparatus particularly adapted for forming continuous filamentary articles from a coagulable liquid which comprises, a vertically disposed cylindrical body member, a flanged head member mounted atop the body member and having a groove in its under surface into which the upper rim of the body member extends, a flanged base member having a groove in its upper surface into which the lower rim of the body member extends, screw means extending between the flange of said head member and the flange of said base member serving to render the connections between the body member and the head and base members essentially gas tight, a sleeve member extending vertically through a complementary opening in said head member and into the chamber defined in part by said body member, sealing means interposed between said sleeve member and said head member, a supply tube extending through said sleeve member and into the said chamber to a point beyond the lower end of the sleeve member, a tubular member extending through an aperture in said base member and into said chamber to a point below the lower end of said supply tube, the vertical axis of said tubular member coinciding substantially with the vertical axis of said supply tube, and a plurality of vertical passageways in said base member spaced about the aperture therein through which said tubular member passes.

17. The apparatus claimed in claim 16 in which said tubular member is flared at its upper end.

18. The apparatus claimed in claim 16 in which the said vertical passageways in said base member each increase progressively in cross sectional area from bottom to top.

ALBERT O. RYAN.

REFERENCES CITED

The following references are of record in the file of this patent:

UNITED STATES PATENTS

| Number | Name | Date |
| --- | --- | --- |
| 957,460 | Elsasser | May 10, 1910 |
| 1,676,334 | Kempf | July 10, 1928 |
| 2,046,575 | Ostermann | July 7, 1936 |
| 2,402,846 | Ryan | June 25, 1946 |